United States Patent
Parthasarathy et al.

(10) Patent No.: US 10,841,313 B2
(45) Date of Patent: Nov. 17, 2020

(54) SUBSTITUTING CALLBACK URLS WHEN USING OAUTH PROTOCOL EXCHANGES

(71) Applicant: Nutanix, Inc., San Jose, CA (US)

(72) Inventors: Ranjan Parthasarathy, Milpitas, CA (US); Vinod Gupta, Fremont, CA (US)

(73) Assignee: Nutanix, Inc., San Jose, CA (US)

( * ) Notice: Subject to any disclaimer, the term of this patent is extended or adjusted under 35 U.S.C. 154(b) by 287 days.

(21) Appl. No.: 15/901,461

(22) Filed: Feb. 21, 2018

(65) Prior Publication Data
US 2019/0334911 A1 Oct. 31, 2019

(51) Int. Cl.
*H04L 29/06* (2006.01)
*G06F 21/62* (2013.01)
*H04L 9/32* (2006.01)
*H04L 29/08* (2006.01)

(52) U.S. Cl.
CPC ........ *H04L 63/102* (2013.01); *G06F 21/6218* (2013.01); *H04L 9/3213* (2013.01); *H04L 63/0281* (2013.01); *H04L 63/0807* (2013.01); *H04L 63/0884* (2013.01); *H04L 67/10* (2013.01)

(58) Field of Classification Search
CPC . H04L 63/08; H04L 63/0807; H04L 63/0815; H04L 63/0884
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 8,997,097 B1 | 3/2015 | Aron et al. | |
| 9,052,936 B1 | 6/2015 | Aron et al. | |
| 9,256,374 B1 | 2/2016 | Aron et al. | |
| 9,256,475 B1 | 2/2016 | Aron et al. | |
| 9,338,007 B1 * | 5/2016 | Doshi | H04L 63/0815 |
| 9,354,912 B1 | 5/2016 | Aron et al. | |
| 9,389,887 B1 | 7/2016 | Aron et al. | |

(Continued)

OTHER PUBLICATIONS

Aaron Parecki, OAuth 2 Simplified, 2017, https://aaronparecki.com/oauth-2-simplified/ (Year: 2017).*

(Continued)

*Primary Examiner* — Khang Do
(74) *Attorney, Agent, or Firm* — Vista IP Law Group, LLP

(57) ABSTRACT

Systems for computer security. A proxy service implements methods for substituting callback uniform resource locators (URLs) when using an OAuth protocol exchange to authenticate an application. A proxy service is established at a first uniform resource locator to carry out communications between one or more identity access management servers and a plurality of application hosting sites. At least one of the plurality of application hosting sites has a second uniform resource locator that is different from the first uniform resource locator. An identity access management server will register the application and the first uniform resource locator. From any hosting site, the application is invoked, upon which invocation, the application carries out at least a portion of the OAuth protocol exchange with the IAM. The proxy service at the first uniform resource locator receives an authentication message from the IAM and then redirects the authentication message to the application hosting site.

21 Claims, 15 Drawing Sheets

(56) References Cited

U.S. PATENT DOCUMENTS

| | | | |
|---|---|---|---|
| 9,575,784 B1 | 2/2017 | Aron et al. | |
| 9,619,257 B1 | 4/2017 | Aron et al. | |
| 9,772,866 B1 | 9/2017 | Aron et al. | |
| 10,044,808 B2* | 8/2018 | Yendluri | G06F 9/541 |
| 10,454,940 B2* | 10/2019 | Lander | H04L 63/102 |
| 10,705,823 B2* | 7/2020 | Pitre | H04L 63/104 |
| 2012/0266229 A1* | 10/2012 | Simone | H04L 63/10 726/9 |
| 2012/0278872 A1* | 11/2012 | Woelfel | H04L 63/0281 726/7 |
| 2013/0227663 A1* | 8/2013 | Cadenas Gonzalez | H04L 67/02 726/6 |
| 2014/0007198 A1* | 1/2014 | Durbha | H04L 63/102 726/4 |
| 2014/0040987 A1* | 2/2014 | Haugsnes | G06F 21/31 726/3 |
| 2015/0134956 A1* | 5/2015 | Stachura | H04L 63/0807 713/168 |
| 2016/0028737 A1* | 1/2016 | Srinivasan | H04L 63/0807 726/1 |
| 2016/0219039 A1* | 7/2016 | Houthooft | H04L 9/3228 |
| 2016/0219060 A1* | 7/2016 | Karunakaran | H04L 63/10 |
| 2016/0366119 A1* | 12/2016 | Rykowski | G06F 21/44 |
| 2018/0131685 A1* | 5/2018 | Sridhar | H04L 9/30 |
| 2018/0316657 A1* | 11/2018 | Hardt | H04L 63/205 |
| 2019/0057204 A1* | 2/2019 | Marcovecchio | H04L 63/1433 |
| 2019/0069168 A1* | 2/2019 | Belote | G06F 21/31 |
| 2019/0132320 A1* | 5/2019 | Burckhardt | G06F 21/604 |

OTHER PUBLICATIONS

Hardt, rfc6749, 2012, https://tools.ietf.org/html/rfc6749 (Year: 2012).*

Wikipedia. "NAT Port Mapping Protocol". Sep. 10, 2017. 2 pages.

Wikipedia. "OAuth". Jan. 17, 2018. 9 pages.

Wikipedia. "Uniform Resource Identifier". Dec. 21, 2017. 10 pages.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication dated based on indicated capture date by Archive.org; first publication date unknown).

Poitras, Steven. "The Nutanix Bible" (Jun. 20, 2014), from http://stevenpoitras.com/the-nutanix-bible/ (Publication dated based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Cano, I. et al., "Curator: Self-Managing Storage for Enterprise Clusters", 14th USENIX Symposium on Networked Systems Design and Implementation, NSDI '17, (Mar. 27, 2017).

* cited by examiner

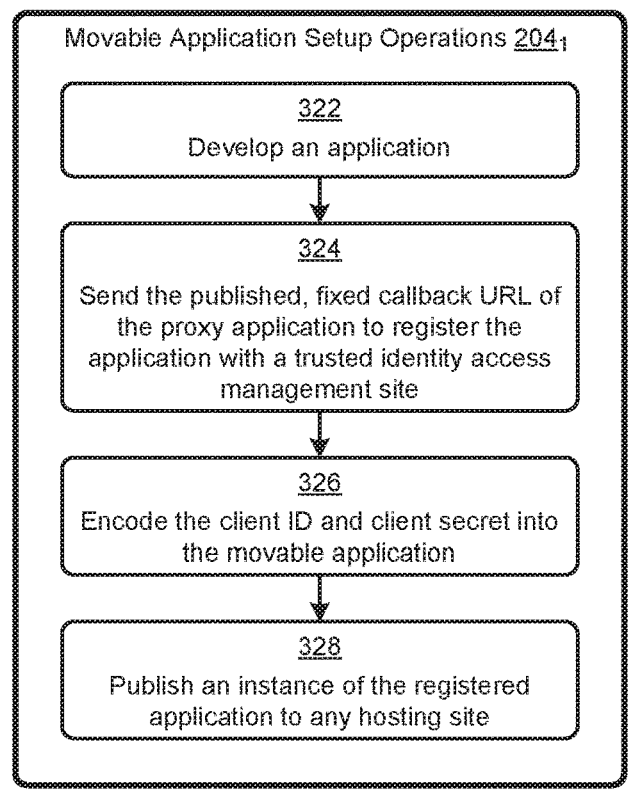
FIG. 3B1

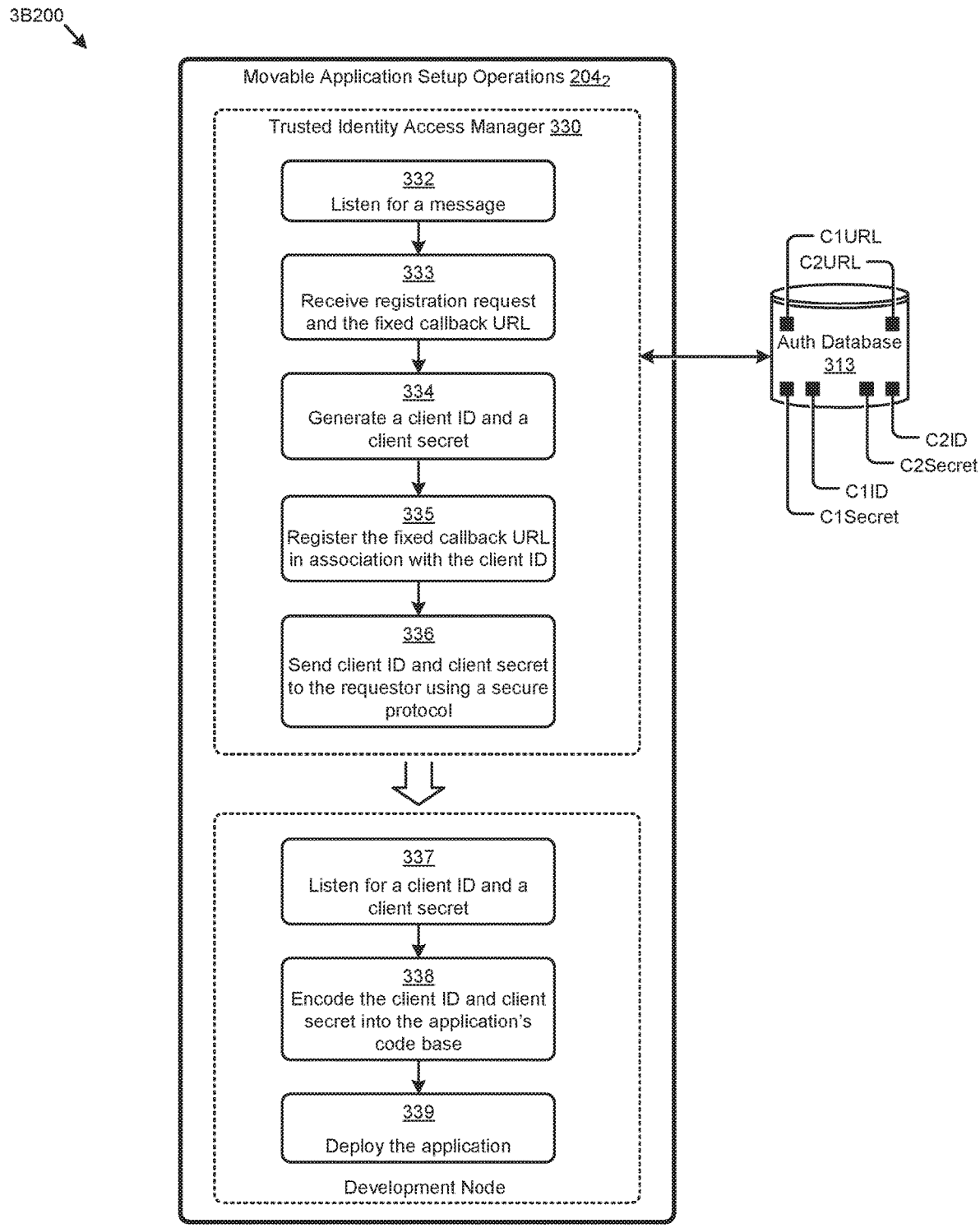
FIG. 3B2

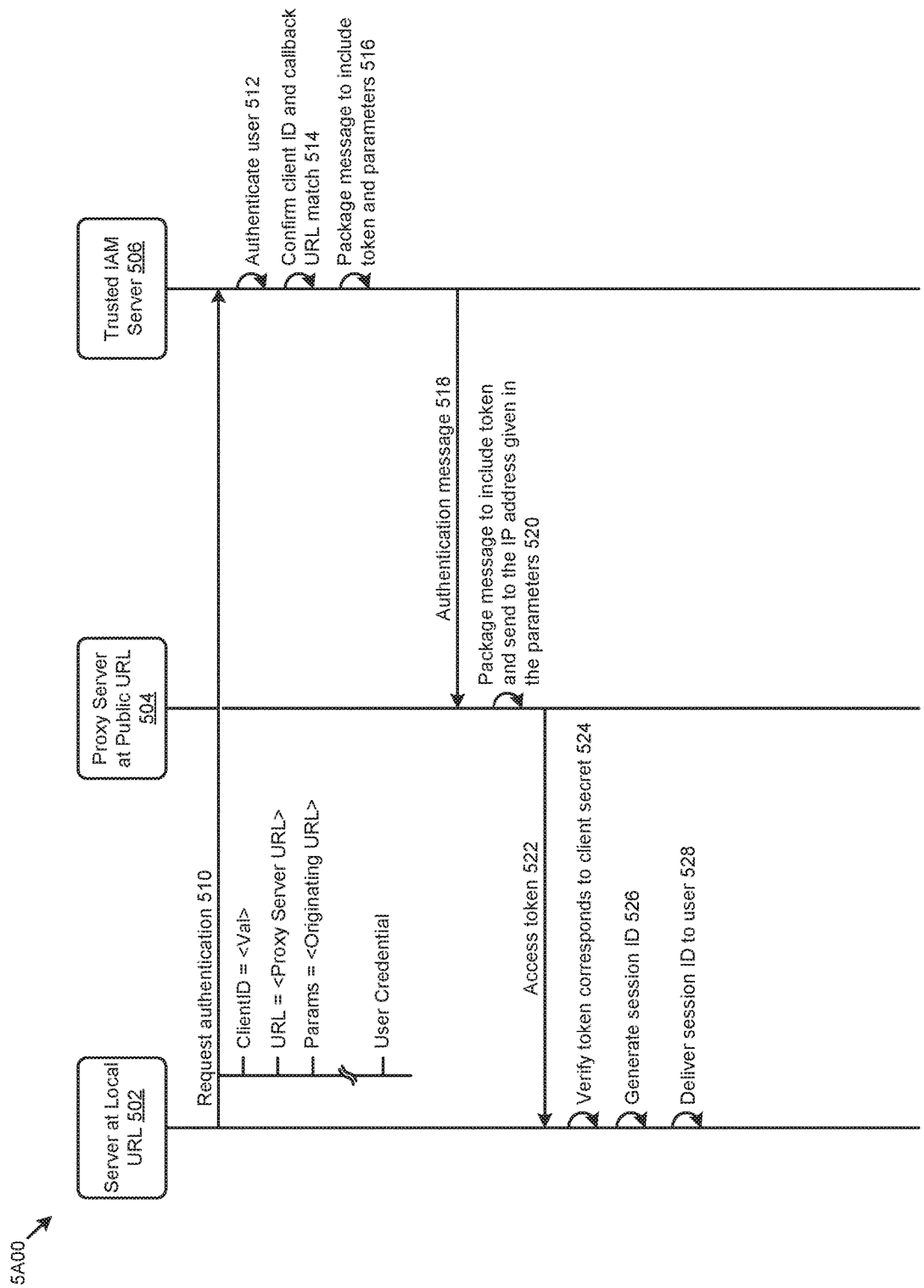

SUBSTITUTING CALLBACK URLS WHEN USING OAUTH PROTOCOL EXCHANGES

FIELD

This disclosure relates to computer security protocols, and more particularly to techniques for substituting callback URLs when using OAuth protocol exchanges.

BACKGROUND

Modern computing systems often support many users who employ many applications. Each user has an identity that can be verified using one or more techniques such as username and password pairs and/or other credentials. With the explosive growth of applications and users who employ these applications, centralized SSOs (single sign-on) repositories and/or standard identity access management (IAM) protocols (e.g., "OAuth" protocols) have become popular. Centralized, trusted IAM repositories that keep track of authenticated users are being managed by several "large" Internet service providers. For example, Google, LinkedIn and Facebook each provide publicly-accessible functions (e.g., web services) to test whether or not a particular user has a verifiable identity. Thus, rather than establishing a verified identity and corresponding credentials for every new user of every new application, and then determining where to safely store the user's identity information for every new user of every new application, an IAM repository can be used to verify a user and then store the verified credentials for use in any number of subsequent authentication challenges.

When an application needs to authenticate a user (e.g., to authorize use and grant specific privileges), the application can authenticate the user using one of the aforementioned IAM repositories (or any other IAM repository such as is provided under the standard-compliant OpenID Consortium). In doing so, the user enters a credential (e.g., a username and password pair) that is securely delivered to the IAM service. The IAM service in turn responds with sufficient information so that the application can determine the authenticity of the user's credential. In addition to verifying the user's credentials, the application itself might need to be authenticated (e.g., to reduce the possibility of malicious modification of the application). Accordingly, the application itself can be registered with an IAM service such that the registered application is associated with a particular application credential (e.g., a checksum of the executable form of the application). Using this technique, the application cannot be altered, maliciously or otherwise, without invalidating the credential. That is, if a registered application is altered, that alteration would change the checksum such that the altered application would be deemed as not authenticatable by the IAM service.

During the application registration procedure, an application developer provides the IAM service with a copy of the application (e.g., so that a checksum can be generated by the IAM service) as well as a uniform resource locator (URL) of where the application is to be hosted. Upon a request by a developer to begin the application registration procedure, and using the given copy of the application, the IAM service generates a "Client ID" (e.g., a string or numeric value), and a "Client Secret" (e.g., another string or numeric value), and registers the given URL. The developer embeds the "Client ID" and "Client Secret" into the code base of the application. As such, the application and its location become registered such that both the "bits" of the application as well as its location are stored or otherwise made verifiable by the trusted IAM service at future moments. The application code base, now, having an embedded client ID and an associated client secret, can be authenticated by the trusted IAM upon any future invocation of the application.

At this point, since the developer of the application has stored the client ID and client secret into the code base of the application in a particular secure manner (e.g., in accordance with the OAuth standard), any invocation of the exact same application that has exactly the same client ID and client secret can pass authentication checks that are performed by the IAM service. When a user wants to operate the application, the user invokes the application from an interface, which in turn will initiate authentication of the application and the invoking user through the IAM service. If the service can authenticate both the application and the user, the service will return an access token to the resource at the registered URL. The authenticated user can then invoke the authenticated application from the registered URL.

Unfortunately, modern computer systems comprise many nodes—sometimes hundreds of nodes or more—that are dynamically assigned under computer control to perform any of a set of constantly-changing functions. For example, at one moment, a node might be assigned to host a database application, and at another time, that same node might be assigned to host a web server application. As another example, at one moment, a particular node might be assigned into a first customer or tenant, and at another moment in time, that same node might be assigned into a second customer or tenant. In such settings, the URL of applications of any sort might need to change (e.g., to be moved from one hosting site to another hosting site, or to change its URL due to changing tenant configurations). In such cases, at a first moment in time, an application hosting site might initially be at URL1, but at a later moment, possibly due to hosting site changes, and/or possibly due to load balancing operations, and/or possibly due to any other types of host assignment operations, the application hosting site might be changed to URL2. This means that the original URL that had been registered (e.g., URL1) would no longer match with the invoking URL (e.g., URL2), and invocations of that application would fail. One way to deal with this is to go through the IAM registration process again (e.g., to register URL2), however this requires developer intervention, which is time consuming and potentially extremely bothersome to developers. In certain environments (e.g., in clustered computing environments) where hundreds or thousands of applications are frequently re-hosted, this becomes impractical.

What is needed is a technique to allow an authenticated application to be moved from one hosted site to another hosted site, but without requiring re-registration every time the application is re-hosted.

SUMMARY

The present disclosure describes techniques used in systems, methods, and in computer program products for substituting callback URLs when using OAuth protocol exchanges, which techniques advance the relevant technologies to address technological issues with legacy approaches. More specifically, the present disclosure describes techniques used in systems, methods, and in computer program products for using OAuth protocols in the presence of dynamically-changing application hosting sites. Certain embodiments are directed to technological solutions for providing a proxy service to manage application hosting site changes without requiring re-registering of the application with a trusted site such as an IAM.

The disclosed embodiments modify and improve over legacy approaches. In particular, the herein-disclosed techniques provide technical solutions that address the technical problems attendant to re-registering an application with a trusted identity service each time the application hosting site changes. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. As one example, elimination of the need for re-registration whenever an application is hosted as a different URL serves to reduce the demand for computer processing power as well as to reduce network bandwidth use since the re-registration need not be performed at all as was necessary in legacy implementations.

Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of application authentication as well as advances in various technical fields related to multi-node, and/or multi-tenant computing platform management.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 3B1 depicts certain setup operations of a movable application development system for defining an application that uses OAuth protocols in the presence of dynamically-changing application hosting sites, according to an embodiment.

FIG. 3B2 depicts an application registration system that uses OAuth protocols in the presence of dynamically-changing application hosting sites, according to an embodiment.

FIG. 5A and FIG. 5B are protocol diagrams that depict messaging protocols as used when performing the OAuth protocol in the presence of dynamically-changing application hosting sites, according to an embodiment.

DETAILED DESCRIPTION

Figure 1:
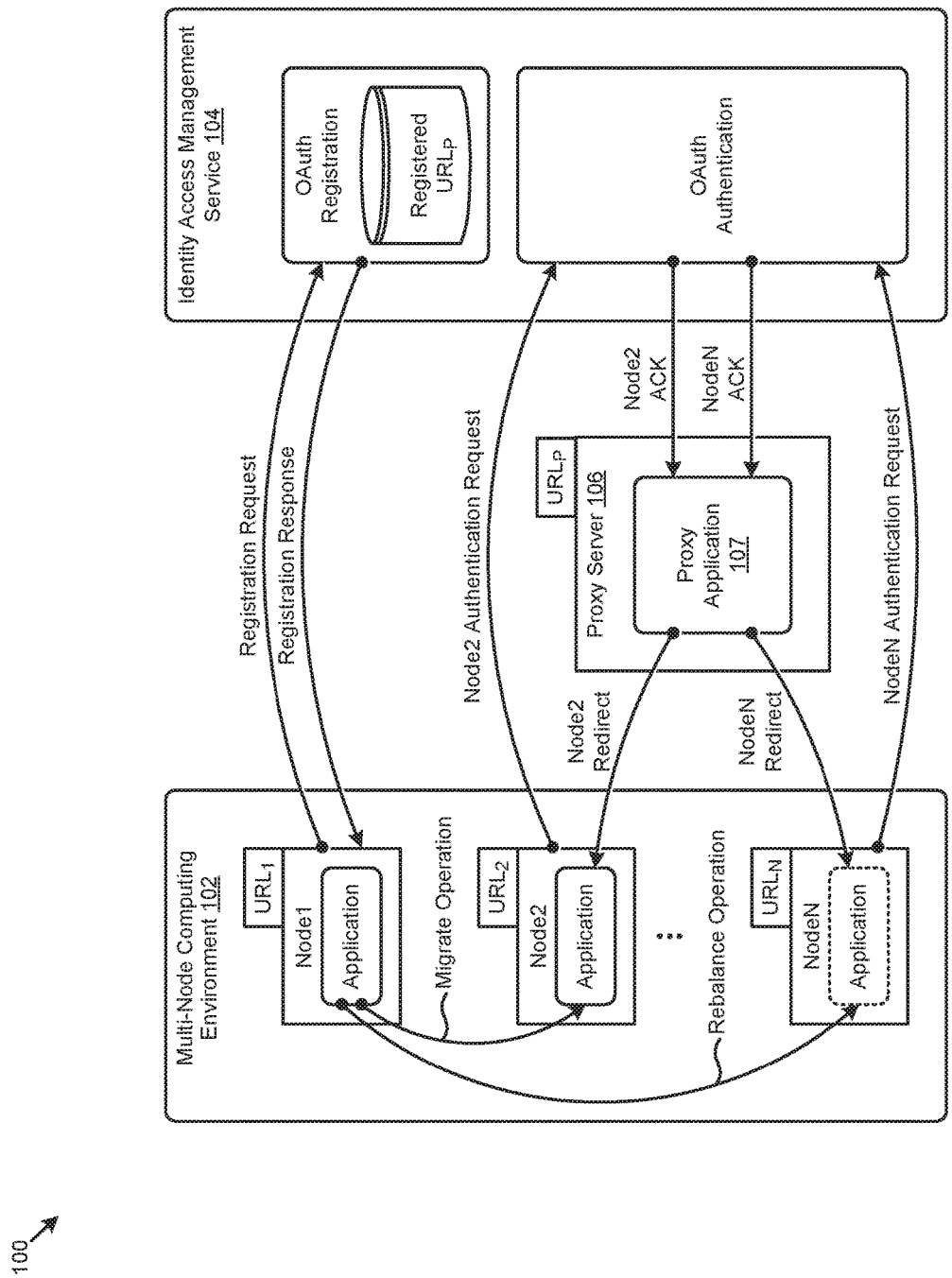
FIG. 1 depicts a computing system for carrying out authentication steps using OAuth protocols in the presence of dynamically-changing application hosting sites, according to an embodiment.

Embodiments in accordance with the present disclosure address avoidance of re-registering an application with a trusted identity service each time the application hosting site changes. Some embodiments are directed to approaches for providing a proxy service to manage application hosting site changes without requiring re-registering of the application with a trusted site. The accompanying figures and discussions herein present example environments, systems, methods, and computer program products for using OAuth protocols in the presence of dynamically-changing application hosting sites.

Overview

Standard OAuth protocols (e.g., OAuth, OAuth2, etc.) rely on pre-registration of an application with a trusted site. When the application is executed, a trusted service that implements all or a portion OAuth authentication will verify that the application has not been altered since registration. This prevents undetected malicious alterations of the application (e.g., which alterations might introduce malware or bugs). In accordance with common deployments of the OAuth protocol, this is accomplished by embedding a secret code into the executable of the application before calculating a checksum (which checksum is then registered), and by verifying that the hosting site has not changed since registration (e.g., which might be indicative of mal-intent or misappropriation).

More specifically, as for the secret code, the trusted OAuth service will generate a client ID and a corresponding client secret, which are delivered securely to the developer who, in turn, manually embeds the secret code into the code base of the application to be registered. A checksum of the code base of the application that includes the embedded secret code is calculated. The calculated checksum is used as an indication that a particular instance of the application has not changed since registration with the trusted OAuth-compliant IAM service. More specifically, when a registered application launches, it consults with such a trusted IAM service. If the checksum value of that instance of the application is the same as the checksum value that was registered with the trusted IAM service, then the "bits" of that instance of the application are deemed/determined to be unaltered since the registration of the application.

As for verifying that the hosting site has not changed since registration, this is accomplished through the aforementioned registration process whereby the URL of the hosting site is also registered by the trusted site. Later, upon an invocation of the registered application, the registered URL is used to communicate an access token to a listener/application at the registered URL. The listener/application then performs the application-side processing of the OAuth protocol. If the receiving resource is indeed listening at the registered URL (e.g., the registered URL matches the URL of the hosting site), then authentication processing proceeds, and the application uses the access token to carry out application commands as may be directed by a user.

As can be seen, as long as the tests or actions involving checking that the "bits" of the application have not changed succeed, and also the tests or actions that the hosting site of the application has not changed succeed, then the application is deemed authenticated. The OAuth requirement that both types of tests/actions succeed presents a limitation that becomes a problem when the application is operated in computing environments where hosting sites for computing entities change frequently.

One example of a computing environment where hosting sites change frequently is a multi-node or multi-tenant computing cluster. In systems with multiple nodes, many of which might be identically configured, a supervisor or hypervisor or other agent might assign any computing process to any available computing node. As such, when an application that had been registered from a node "Node1" at URL1 is moved or migrated or otherwise designated to be run from a different node (e.g., "Node2" at URL2), then the URL of the hosting site necessarily changes (e.g., from the IP address of node1 to the IP address of node2). This causes OAuth to fail.

In many modern systems (e.g., in clustered computing systems), it is possible that the cluster might support many nodes and/or tenants, each of which in turn are tasked to run one or more instances of the applications—all of which might fail to pass at least the second tests or actions of the OAuth protocol due to the hosting node URL being different from the registered URL.

The topology and network addressing of multi-node computing systems exacerbates the aforementioned problems, and techniques for allowing for different hosting sites without failing the OAuth protocol need to be brought to bear. One possible technique involves deploying a publicly-addressable proxy server (e.g., a server having a publicly-addressable IP address) which can be deemed at the time of application registration to be the hosting site for an application to be registered. After registration, when the application is invoked from a dynamically-determined node, the application checks with the trusted site to have it perform its checks that the "bits" have not been altered. If the check passes, then the trusted site sends a reply (e.g., a reply that includes an access token) to the registered URL which, in this case, is the publicly-addressable proxy server. This publicly-addressable proxy server receives the response and access token from the trusted site and forwards a version of the OAuth reply as well as the access token to the application running at the dynamically-determined node. The application running at the dynamically-determined node completes the application-side OAuth protocol tests. The tests will pass, and the authenticated application can proceed. Some commands might use the forwarded access token to gain access to computing resources that are needed to carry out such commands.

The above techniques and several variations are disclosed in the appended figures.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 depicts a computing system 100 for carrying out authentication steps using OAuth protocols in the presence of dynamically-changing application hosting sites. As an option, one or more variations of computing system 100 or any aspect thereof may be implemented in the context of the architecture and functionality of the embodiments described herein. The computing system 100 or any aspect thereof may be implemented in any environment.

FIG. 1 illustrates one way to provide a proxy service to manage application hosting site changes without requiring re-registering of the application with a trusted site. Specifically, the figure is being presented with respect to its contribution to addressing the problem of onerous re-registration of an application with a trusted identity service each time the application hosting site changes.

The embodiment shown in FIG. 1 is merely one example. As shown, a proxy server 106 is situated between an identity access management service 104 and a set of application-hosting nodes that are situated in a multi-node computing environment 102. The problem that is addressed by the disclosures herein arise when an application is moved (e.g., migrated or rebalanced) from its registered hosting node to another hosting node. In moving the application from one node to another node, the URL (e.g., the URL for accessing the node or any of its constituent resources) changes, thus "breaking" the rules for authentication that are established and enforced by the OAuth protocols.

More specifically, when a previously-registered application such as the shown Application at Node1 is invoked from the same URL as the registered location, the OAuth protocol that is carried out by the IAM and the application itself will succeed. However, if, due to a migration operation to a different URL or a rebalancing operation to a different URL, or merely due to an invocation of another instance at a different URL (e.g., for another user of the multi-node computing system), then the unaltered OAuth protocol will not complete or otherwise fail—as intended—since the URL of the migrated, rebalanced, or re-invoked instance will be at a different URL than the registered URL.

Nevertheless, in modern multi-node computing environments, acts of migration and/or rebalancing and/or movements in support of multiple nodes being used by multiple users happens frequently. To accommodate situations when acts of migration and/or rebalancing cause an application to be moved to different URLs, a proxy server 106 is established. Applications are registered with the IAM and, during the registration procedure, the URL of the proxy server is registered in correspondence with the application being registered. Thus, when any instance of the registered application is invoked from any URL, the IAM will carry out a portion of the OAuth protocol with the proxy server—since that URL of the proxy server is the URL that was registered with the IAM. The proxy application 107 serves to (1) carry out a first portion of the OAuth protocol with the IAM, and (2) forward messages from the IAM to the invoked instance (to the resource at the URL of the invoked instance). The address (e.g., URL) of the invoked application instance is given to the IAM during a particular phase of the OAuth protocol. Specifically, the address in the form of a URL of the invoked application instance is delivered to the IAM, and the IAM relays that given URL as provided by the invoked application instance to the proxy application. The proxy application 107 operates in a manner such that the URL that had been relayed by the IAM to the proxy server can then be used as the URL address of the invoking application instance.

In the specific example of FIG. 1, the application (first instance) is registered with the IAM. The registration procedure includes registration of the URL of the proxy server rather than the URL$_1$ referencing the shown Node1. As such, subsequent authentication attempts such as is depicted by the shown "Node2 Authentication Request" will cause the portion of the OAuth protocol that is performed by the IAM to reference the URL of the proxy server. Such messaging would result in the shown "Node2 ACK". The proxy server redirects to the URL2 of the invoking node/resource using the "Node2 Redirect" message. Additional portions of the OAuth protocol are carried out by the second instance of the application at Node2, and the second instance of the application is thusly authenticated.

The foregoing example pertaining to the second instance that arises due to a migration operation is merely one example. Any other instance or instances of the application can be invoked for any of a wide variety of reasons. As shown, a rebalance operation might cause a first instance of an application to be moved to another node (e.g., to NodeN at URLN, as shown). That instance can initiate authentication via the shown "NodeN Authentication Request", which will cause the portion of the OAuth protocol that is performed by the IAM to reference URL of the proxy server. The invocation from NodeN would result in the shown "NodeN ACK". The proxy server redirects messaging to the URLN of the invoking node/resource using the "NodeN Redirect" message, and the instance invoked from NodeN is thusly authenticated.

Further details pertaining to the particulars of registration and the particulars of proxy operations are shown and discussed as pertains to the following figures.

Figure 2:
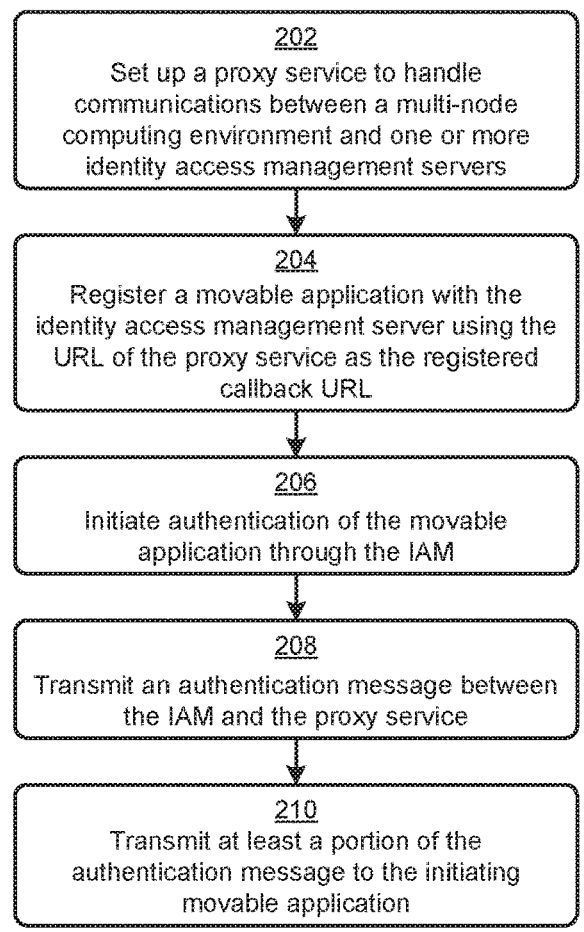
FIG. 2 is a flowchart depicting authentication steps for using OAuth protocols in the presence of dynamically-changing application hosting sites, according to an embodiment.

FIG. 2 is a flowchart 200 depicting authentication steps for using OAuth protocols in the presence of dynamically-changing application hosting sites. As an option, one or more variations of flowchart 200 or any aspect thereof may be implemented in the context of the architecture and functionality of the embodiments described herein. The flowchart 200 or any aspect thereof may be implemented in any environment.

FIG. 2 illustrates one aspect pertaining to achieving providing a proxy service to manage application hosting site changes without requiring re-registering of the application with a trusted site. Specifically, the figure is being presented with respect to its contribution to avoiding re-registering an application with a trusted identity service each time the application hosting site changes.

The embodiment shown in FIG. 2 is merely one way to establish a proxy service to manage application hosting site changes without requiring re-registering of the application with a trusted site. Practice of the steps of the shown flow (e.g., step 202, step 204, step 206, step 208, and step 210) results in authentication of a "moved" instance of a pre-registered application.

The flow commences at step 202 where the proxy service is set up. Specifically, a proxy service is established to handle OAuth protocol communications between an IAM and computing environments that host one or more of the applications to be moved from node to node. Such an application can be registered (at step 204) with an IAM. Specifically, and as shown, the URL that is provided in the registration procedure for the particular application is the URL of the proxy service. A proxy service can be implemented as a freestanding server (e.g., such as is depicted in FIG. 1), or the proxy service can be a web service or other function that is accessible via a publicly-addressable URL. For example, the URL might be provided in the form of a domain name that is resolvable using a publicly-addressable DNS server. Although the URL of the proxy service refers to a web service or other function that is logically accessible via a public address, the URLs of the nodes that host the movable applications can be URLs that are behind a firewall or router, so long as there is some mechanism provided to perform some form of network address translation (e.g., the NAT port mapping protocol) that resolves to the unique address of the node or resource. For example, the proxy service might be implemented within a multi-node computing environment. A router within such a multi-node computing environment can be configured to route certain traffic to the proxy service, and the proxy service can rely on the configuration of the router to be able to route traffic from the outside the firewall to a resource that is inside the firewall. Any known techniques can be used by the router to uniquely identify a particular node or resource of the multi-node computing environment.

When a new instance of the movable application is launched, the instance itself will initiate authentication (step 206). This initiation of an application authentication is one of the portions of the OAuth protocol that is performed by a registered application. In this case, the movable application is an instance of the same application that had been registered in step 204. The movable application supplies the aforementioned client ID to the IAM, and the IAM in turn looks up the identifying information needed to generate a checksum for the code base of the application. If the application had not been altered since registration, then the IAM responds by sending an access token to the resource at the corresponding registered URL, which in this case is the URL of the proxy service. The proxy service receives the authentication message transmitted from the IAM (at step 208). After the proxy service processes the authentication message (e.g., an authentication message that includes an access token), the proxy service redirects messaging to the resource of the invoked instance of the application. The access token is then forwarded (at step 210) to the invoking instance of the application. The application is now deemed as authenticated, and is now able to use the access token to carry out authorized operations. As is known in the art, the OAuth protocol is able to authenticate both an application as well as a user. As such, the access token might be specific to the particular user that invoked the now authenticated instance of the application.

As pertaining to step 202, in many environments, the proxy service itself might be registered with an IAM. This can happen during the course of development and setup of an application that serves various functions of the proxy service. One flow for a proxy application registration and setup is shown and described as pertains to the proxy application development system of FIG. 3A.

Figure 3A:
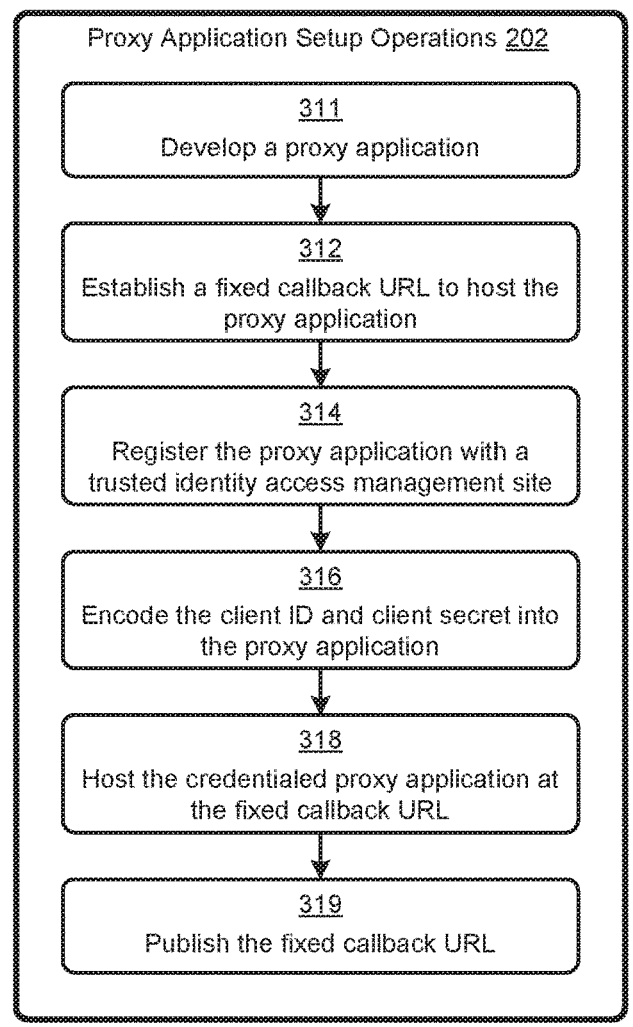
FIG. 3A depicts certain operations of a proxy application development system for defining and setting up a proxy service that carries out a portion of OAuth protocols, according to an embodiment.

FIG. 3A depicts certain operations of a proxy application development system 3A00 for defining and setting-up a proxy service that carries-out a portion of OAuth protocols. As an option, one or more variations of the proxy application development system or any aspect thereof may be implemented in the context of the architecture and functionality of the embodiments described herein. The proxy application development system or any aspect thereof may be implemented in any environment.

FIG. 3A illustrates proxy application setup operations that are performed in conjunction with establishing a proxy service to manage application hosting site changes without requiring re-registering of the application with a trusted site. Specifically, the figure is being presented with respect to a technique for establishing a proxy service such as embodied by the proxy application 107 of FIG. 1.

In the shown embodiment, at step 311, a proxy application is developed (e.g., on a proxy application development node). Such a proxy application development node might be a standalone development server, or it might be hosted within a multi-node computing environment 102. In this embodiment, and regardless of the specific deployment of the proxy application development node, a range of proxy application setup operations are carried out. After carrying out such proxy application setup operations the proxy application becomes credentialed.

The proxy application is then hosted as a resource at a fixed callback URL (step 318). This fixed callback URL is published (step 319) such that movable application developers can use the fixed callback URL when registering a movable application. The fixed callback URL can be determined (at step 312) based on a network topology. The fixed callback URL can be coded as dotted quads (e.g., "75.75.10.10"), or the fixed callback URL can be coded as a DNS-resolvable domain name (e.g., "oauth.proxy:3310"). Regardless of the format or coding of the fixed callback URL of the proxy, the fixed callback URL can be registered (e.g., through a protocol exchange with the IAM) as the registered callback URL of the movable application. Moreover, the proxy application itself can be registered (at step 314) with the IAM. Registration of the proxy application with an IAM provides an additional degree of security that some users of a cluster or other form of a multi-node computing environment will demand. In accordance with the OAuth protocol, the IAM server produces a client ID and client secret, at least a portion of which is encoded (at step 316) into the proxy application code base. This step serves as a measure of security that the registered proxy application has not been tampered with since registration.

Once the proxy application URL has been established (e.g., so it can be used as the callback URL in a movable application registration), then at least some of the movable application setup operations can be performed. As depicted in the embodiments shown in the following FIG. 3B1 and FIG. 3B2, some of the movable application setup operations can be performed on an application development node, and some of the movable application setup operations can be performed by a trusted IAM.

Details of certain of the various movable application setup operations might be implemented on a movable application development node and some of the various movable application setup operations might be implemented on an identity access management server.

FIG. 3B1 depicts certain setup operations of a movable application development system 3B100 for defining an application that uses OAuth protocols in the presence of dynamically-changing application hosting sites. As an option, one or more variations of movable application development system or any aspect thereof may be implemented in the context of the architecture and functionality of the embodiments described herein. The movable application development system or any aspect thereof may be implemented in any environment.

FIG. 3B1 illustrates one aspect pertaining to providing a proxy service to manage application hosting site changes without requiring re-registration of the application with a trusted site. Specifically, the shown setup operations of a movable application development system serve to implement portions of a protocol that address avoidance of re-registering an application with a trusted identity service each time the application hosting site changes.

Various development steps might be carried out on a movable application development node that serves to register the movable application with an IAM. More specifically, during the coding process when an application is developed on the development node (step 322), the developer might decide that this application is to be a hosted application (e.g., hosted on the web), and thus that the application should be protected from malicious acts through OAuth authentication. Also, in some cases, operations of the application include access to resources that are protected under access controls that are specific to a particular user, and thus raises another reason why that the application and its users should be protected using OAuth authentication. After completion of development of the application, the developer can register the code base of the application and its callback URL (i.e., the callback URL of the proxy service) with a trusted IAM (step 324). There are many instances and types of IAMB. In the embodiment described as pertaining to this FIG. 3B1, the selected IAM supports at least OAuth and OAuth2. Some IAMB support additional authentication protocols.

After the trusted IAM provides a client ID and a client secret, the developer of the movable application can encode the client ID and a client secret into the code base of the movable application (step 326). The movable application is then ready for authenticatable use on any node. Specifically, since the client ID and client secret are encoded into the code base of the movable application, it can be moved to any hosting node, so long as the code base as was used to secure a client ID and a client secret is not changed.

At step 328, an instance of the registered application is published in a repository such that any user can deploy an instance of the application on any node. In some cases, such as in a multi-tenant hosting situation, one node can be used by more than one tenant, and partitioning techniques other than partitioning by node boundaries can be employed. In other cases of a multi-tenant hosting situation, a first tenant is partitioned into a particular node at a first moment in time, and at another moment in time, that same node might be assigned to a second tenant. In such settings, the URL of applications of any sort might need to change (e.g., to be moved from one hosting site to another hosting site, or to change URL due to dynamically-changing tenant configurations).

As aforementioned, some of the movable application setup operations are performed by a trusted IAM. One implementation of the movable application setup operations that are performed by a trusted IAM are shown and discussed as pertains to FIG. 3B2

FIG. 3B2 depicts an application registration system 3B200 that uses OAuth protocols in the presence of dynamically-changing application hosting sites. As an option, one or more variations of application registration system 3B200 or any aspect thereof may be implemented in the context of the architecture and functionality of the embodiments described herein. The application registration system 3B200 or any aspect thereof may be implemented in any environment.

FIG. 3B2 illustrates communications between an application development node and an IAM. The shown protocol and the underlying operations serve to set up a proxy service and a movable application such that when the hosting site changes the application need not be re-registered.

Referring again to the foregoing, some of the movable application setup operations can be performed on an application development node, and some of the movable application setup operations can be performed by a trusted IAM. Strictly for convenience of discussion, the set of movable application setup operations have been partitioned into a first set of movable application setup operations 2041, and a second of movable application setup operations 2042. As shown, the movable application setup operations 2042 are carried out using a messaging protocol between a trusted identity access manager 330 and a development node.

More particularly, an embodiment of a trusted identity access manager listens (at step 332) for a registration message. Any technique can be used for listening, and any technique for partitioning the listening and other processing in the IAM can be used for load balancing purposes and/or for flexible locating of the IAM facility.

When a registration message is received (at step 333) the trusted identity access manager parses the message to identify the nature of the request and, if the request is for a registration of an application, then (at step 334) a client ID and a client secret are generated and stored in authentication database 313. At step 335, the callback URL is associated with the client ID and, in accordance with the aforementioned association, is also stored in the authentication database. The generated client ID and client secret are delivered back to the requestor (at step 336) using a secure protocol. This can happen any number of times for any number of applications. As shown, the authentication database holds a client ID (e.g., C1ID), a client secret (e.g., C1Secret), and a callback URL (e.g., C1URL) for the first registration. Additionally, after a second registration sequence, the depicted authentication database holds a second client ID (e.g., C2ID), a second client secret (e.g., C2Secret), and a second callback URL (e.g., C2URL) for the second registration. The same callback URL can be registered any number of times by any number of callers for any number of applications.

As mentioned in the previous paragraph, the generated client ID and client secret are delivered back to the requestor (at step 336) using a secure protocol. In some embodiments (in particular, in accordance with the embodiments of FIG. 3B1 and FIG. 3B2) a development node such as a proxy application development node or a movable application development node initiates the registration protocol, and accordingly includes one or more operations to listen (at step 337) for the client ID and client secret that was generated by the trusted identity access manager.

In most cases the client ID and client secret that was generated by the trusted identity access manager is accessed by a human developer, who in turn encodes the client ID and client secret into the code base of the application being developed (step 338). Once the client ID and client secret have been encoded into the code base of the application being developed, the application can be deployed (at step 339), possibly to a repository such that any trusted user can invoke an instance of the registered application.

When the registered application is invoked, it initiates application authentication by engaging in a protocol with the trusted IAM. One specific portion of the OAuth protocol that is used to carry out application authentication with the trusted IAM is shown and described as pertains to FIG. 3C.

Figure 3C:
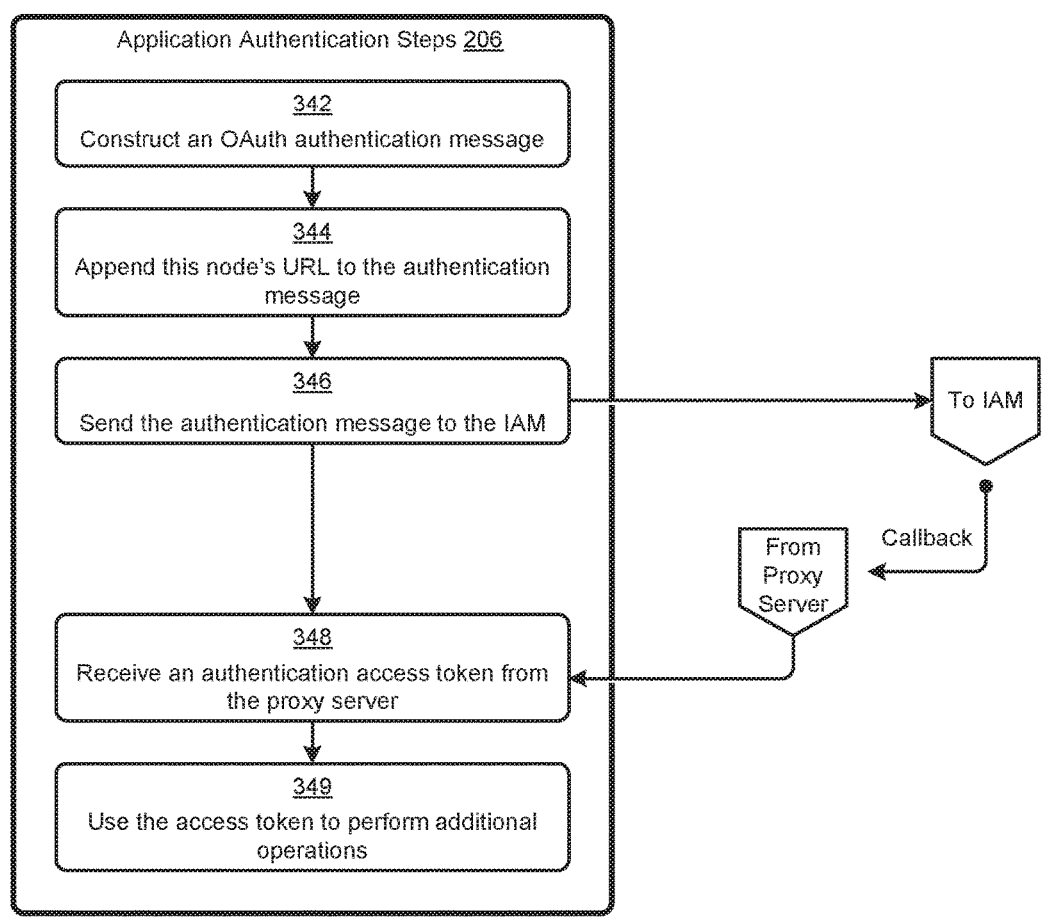
FIG. 3C depicts a series of application authentication interactions that use OAuth protocols in the presence of dynamically-changing application hosting sites, according to an embodiment.

FIG. 3C depicts a series of application authentication interactions 3C00 that uses OAuth protocols in the presence of dynamically-changing application hosting sites. As an option, one or more variations of the series of application authentication interactions 3C00 or any aspect thereof may be implemented in the context of the architecture and functionality of the embodiments described herein. The series of application authentication interactions 3C00 or any aspect thereof may be implemented in any environment.

FIG. 3C illustrates application authentication steps pertaining to providing a proxy service to manage application hosting site changes without requiring re-registration of the application with a trusted site. Specifically, the figure is being presented with respect to its contribution to addressing the problem of having to re-register an application with a trusted identity service each time the application hosting site changes.

Still more specifically, the flow of FIG. 3C include steps that a movable application might perform upon invocation. Some or all of the shown steps (e.g., step 342, step 344, step 346, step 348, and step 349) can be performed automatically by an application. This sequence of steps comports with steps that an application would self-perform when authenticating using OAuth.

Some of the steps are specific to the example system shown and discussed as pertains to FIG. 3A, FIG. 3B1, FIG. 3B2, FIG. 3C, and FIG. 3D. In particular, at step 342, the application constructs an OAuth authentication message to be sent to the IAM. In this case, since the proxy service will need to call back to the application that issues the authentication message, the application will include its own URL in the authentication message. This is accomplished by appending (at step 344) the application's own URL to the OAuth authentication message. The appended portion will be received by the IAM, preserved by the IAM, and sent by the IAM to the URL as registered. Since the appended portion is preserved unmodified and sent by the IAM to the URL as registered without processing or modification by the IAM, step 344 can encode the URL in any manner. In some cases, the appended portion comprises information in addition to the application's own URL. Furthermore, in some cases, the appended portion can be encrypted using any technique that permits decryption by the proxy service. For example, the movable application and the proxy service can agree to use any particular encryption/encoding algorithm. As needed, the movable application and the proxy service can pre-share a key.

In this embodiment, at step 346, the OAuth authentication message is sent to the IAM. In other embodiments, the OAuth authentication message might be sent to the proxy service directly. In certain commercial deployments of computing clusters or other computing systems within a multi-node computing environment 102, clients of the commercial deployments often specify one or another particular IAM (e.g., Google, LinkedIn, etc.), and thus the former embodiment would be applicable. In other commercial deployments of computing clusters or other computing systems within a multi-node computing environment 102, clients do not demand any particular IAM, and thus, the proxy service can itself act as an IAM.

Continuing the discussion of FIG. 3C, at step 348, an access token is received, thus concluding authentication and authorization of the application. The access token is then used by the application (at step 349) to carry out any operations and/or access as may be directed by the code base of the application, with or without user commands or intervention.

The aforementioned access token is a value that originates from an IAM, and which access token is forwarded by the proxy service. Certain technique for doing so are shown and described as pertains to FIG. 3D.

Figure 3D:
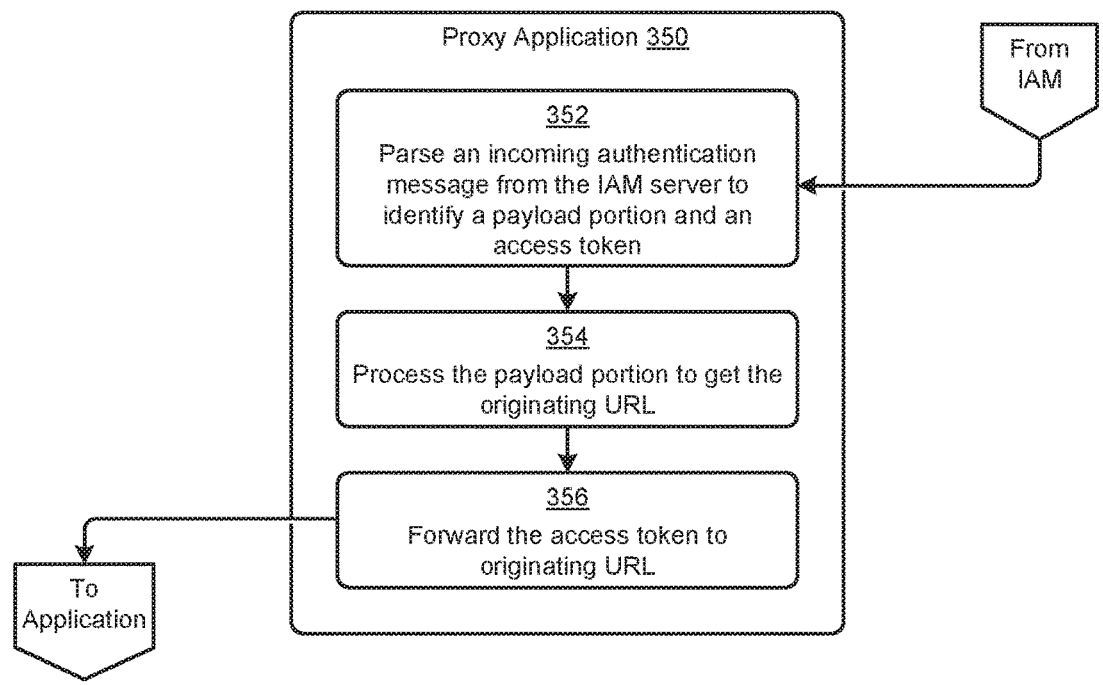
FIG. 3D depicts a proxy server system that performs forwarding of OAuth protocol messages in the presence of dynamically-changing application hosting sites, according to an embodiment.

FIG. 3D depicts a proxy server system 3D00 that performs forwarding of OAuth protocol messages in the presence of dynamically-changing application hosting sites. As an option, one or more variations of proxy server system 3D00 or any aspect thereof may be implemented in the context of the architecture and functionality of the embodiments described herein. The proxy server system 3D00 or any aspect thereof may be implemented in any environment.

FIG. 3D illustrates how a set of proxy service operations contributes to the avoidance of re-registering an application with a trusted identity service each time the application hosting site changes.

The shown flow redirects a message from the IAM to the application that originates with the OAuth protocol. As shown, the proxy application 350 receives (at step 352) an incoming authentication message from an IAM server. The incoming authentication message comprises at least an access token as provided by the IAM server and a payload portion that had been provided by the originator. At step 352, the proxy application parses the incoming authentication message to identify at least the content between delimiters that appear in the payload portion of the incoming authentication message. This embodiment comports with the embodiment of FIG. 3C. Accordingly, the received payload comprises at least one parameter that is or represents the URL of the originating application.

At step 354, the payload is processed so as to extract the URL of the originating application. As earlier mentioned, the payload might be transmitted in an encrypted form. As such, the processing of step 354 might include decoding and/or decrypting the payload. In any of the foregoing cases, the URL of the originator is derived from the message received from the IAM. The authentication message, together with the access token is forwarded (at step 356) to the originator at the URL that was extracted from the incoming message of step 352. The forwarding can be accomplished by forming a URL that includes all or part of the URL of the originator that has been parsed out of the message received from the IAM In some cases, the authentication message is modified so as to remove the URL of the originating application from the authentication message. In other cases, the destination is changed to become the URL of the originator, thereby forming a redirected authentication message.

As depicted in step 349 of FIG. 3C, the originating application receives the access token, then uses the access token to carry out any operations and/or resource accesses as may be directed by the user and/or the code base of the application.

Figure 4:
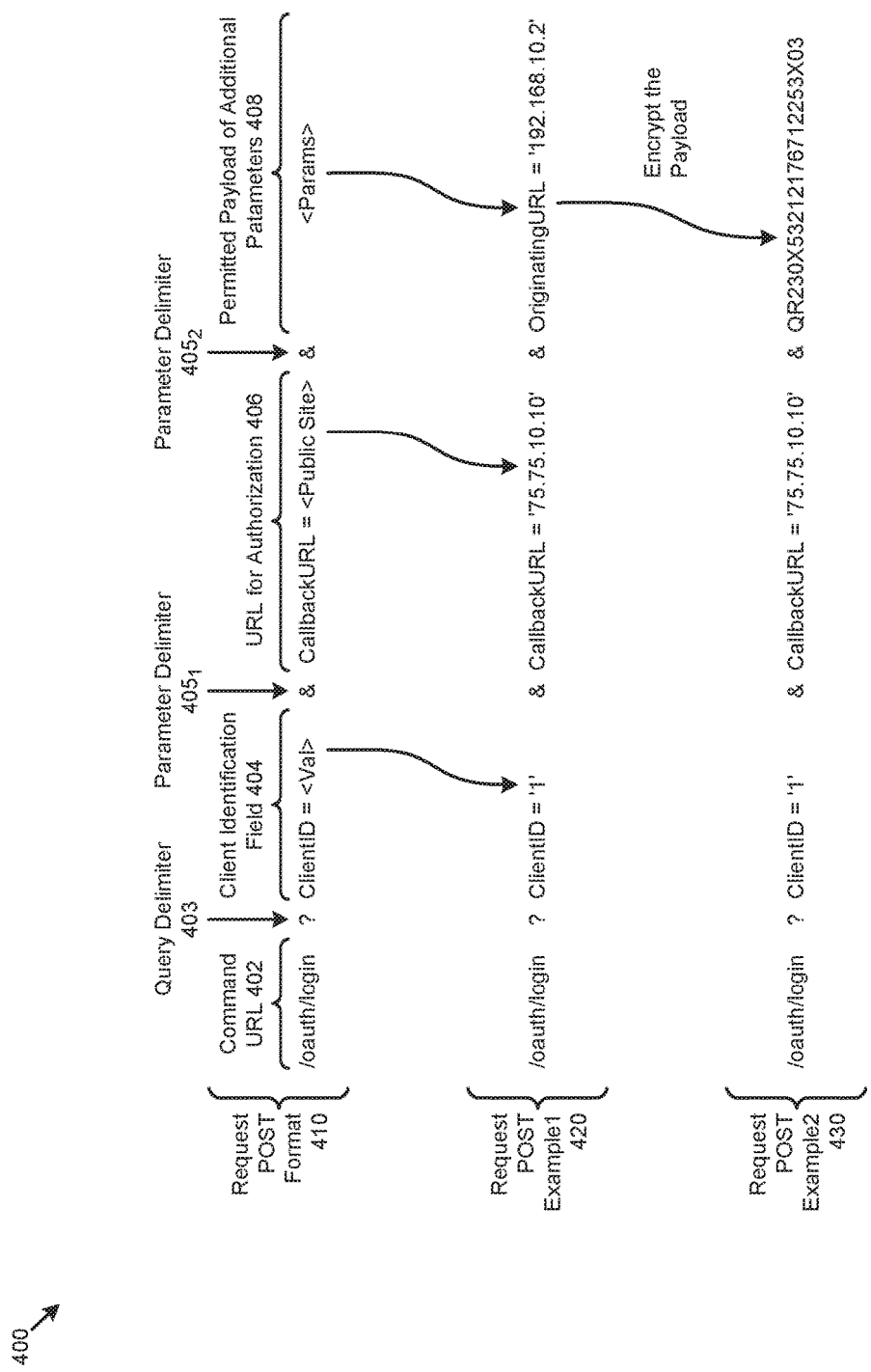
FIG. 4 depicts sample OAuth call constructions that are used when performing an OAuth protocol in the presence of dynamically-changing application hosting sites, according to an embodiment.

FIG. 4 depicts sample OAuth call constructions 400 that are used when performing OAuth in the presence of dynamically-changing application hosting sites. As an option, one or more variations of OAuth call constructions 400 or any aspect thereof may be implemented in the context of the architecture and functionality of the embodiments described herein. The OAuth call constructions 400 or any aspect thereof may be implemented in any environment.

FIG. 4 illustrates several variations of arguments of an HTTP POST command. The shown request POST format 410 depicts a general form. The request POST example1 420 shows some possible values for various fields. The request POST example1 430 shows an encrypted form of the payload field.

The shown request POST format 410 specifies a command URL 402. As shown, the command URL 402 specifies the "login" command. The command is delimited from the following portions using a query delimiter 403. After the query delimiter, the client identification field 404 is presented. In the shown example, the value for "ClientID" is shown as "<Val>", indicating that that field is to be defined with a specific value. This "<Val>" is a value assigned by the IAM at the time of registration. For simplicity, the value of "<Val>" as used in the example is '1'. The shown request POST format 410 also includes a URL for authorization 406 as well as a permitted payload of additional parameters, each of which are delimited by delimiters (e.g., first parameter delimiter $405_1$ and second parameter delimiter $405_2$). These fields are filled in with values, such as is shown by request POST example1 420 and request POST example 2 430. Specifically, request POST example1 420 shows the callbackURL field as "75.75.10.10", indicating a publicly-accessible address. Also, request POST example1 420 shows the permitted payload of additional parameters field 408 as comprising the URL "192.168.10.2", indicating a behindthe-router address that is subject to network address translation by the router. The payload comprising additional information in the permitted payload of additional parameters field can be encrypted. This is shown in the request POST example 2 430, specifically in that the permitted payload of additional parameters field 408 is given in an encrypted form.

Figure 5B:
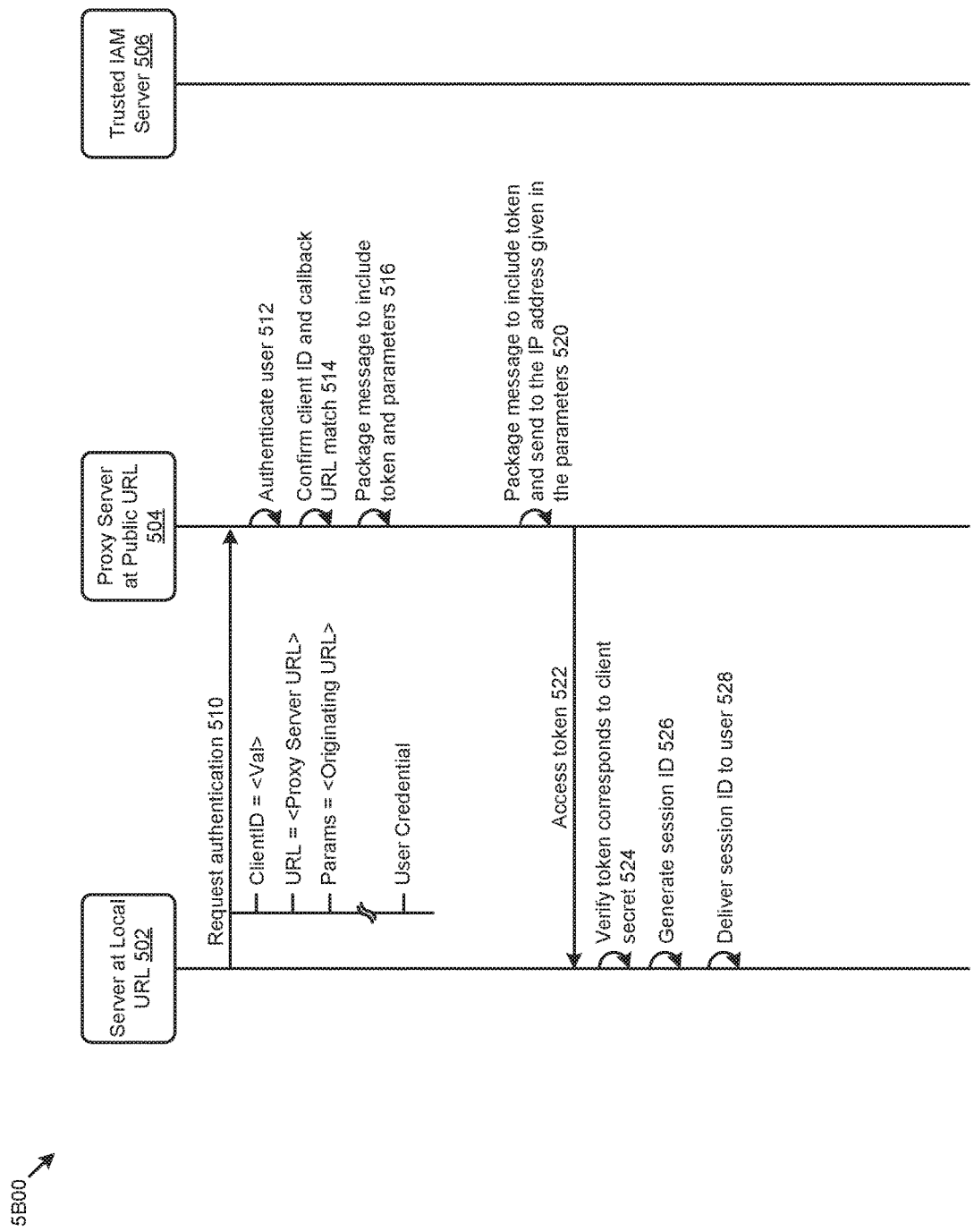

FIG. 5A and FIG. 5B are protocol diagrams that depict messaging protocols 5A00 and 5B00, as used when performing the OAuth protocol in the presence of dynamically-changing application hosting sites. As an option, one or more variations of the messaging protocols or any aspect thereof may be implemented in the context of the architecture and functionality of the embodiments described herein. The messaging protocols or any aspect thereof may be implemented in any environment.

FIG. 5A illustrates a protocol exchange between a server at local URL 502, a proxy server at public URL 504, and a trusted IAM server 506. The results of the shown protocol exchange includes generation of a session ID that is delivered to a user.

The protocol commences when an application running on a server issues a message to request authentication (message 510). This message is received by the trusted IAM server. Processing at the trusted IAM server includes authenticating the user (operation 512), confirming that the client ID and callback URL match the registration database (operation 514), and packaging one or more authentication messages that include one or more access tokens and whatever parameters were sent by the originator (operation 516). The one or more authentication messages include unmodified copies of the additional parameters that were sent by the originator.

In accordance with the herein-disclosed embodiments, the callback URL is the URL of the proxy at a public URL. The proxy at the public URL receives the authentication message with an access token (message 518) and in turn packages a message to include the access token (operation 520). The packaged message including the access token is then set to the originator at the IP address given in the parameters (message 522). The originator at local URL 502 verifies that the access token corresponds to the client secret (operation 524). If the access token does correspond to the client secret, then the originator at local URL 502 generates a session ID (operation 526). The generated session ID is delivered to a user of the application (operation 528).

In some cases, and as previously discussed, it is possible that in some commercial deployments of computing clusters or other computing systems within a multi-node computing environment, clients do not demand any particular IAM, and thus, the proxy service can itself can act an IAM. As such, the messaging and operations performed by the trusted IAM server of FIG. 5A are performed instead by the proxy server at public URL 504). This is shown in FIG. 5B, which figure specifically depicts that the trusted IAM server 506 does not participate in the authentication protocol.

Figure 5C:
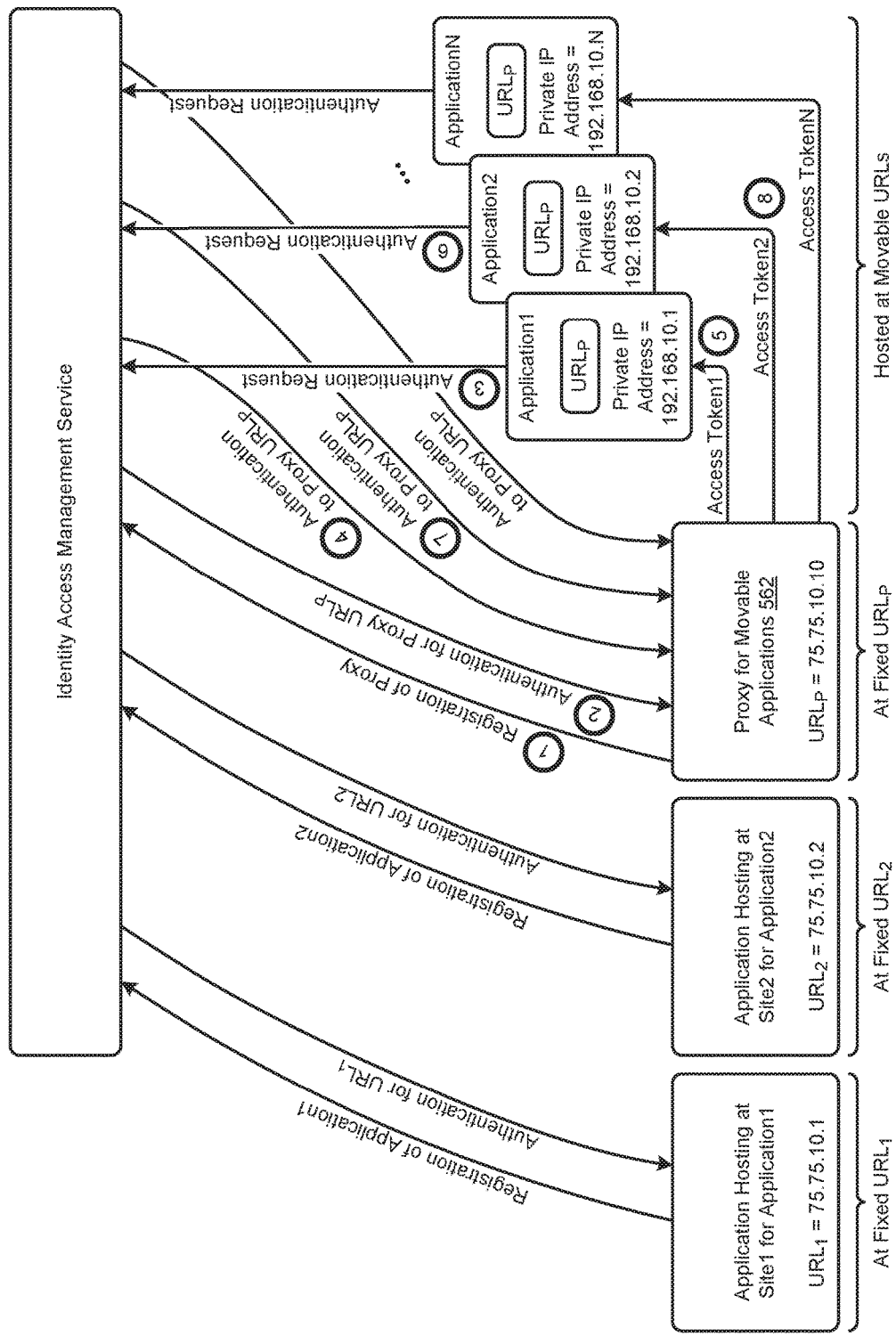
FIG. 5C is a system diagram that depicts inter-component messaging as used when performing the OAuth protocol in the presence of dynamically-changing application hosting sites, according to an embodiment.

FIG. 5C is a system diagram 5C00 that depicts inter-component messaging as used when performing the OAuth protocol in the presence of dynamically-changing application hosting sites. As an option, one or more variations of inter-component messaging or any aspect thereof may be implemented in the context of the architecture and functionality of the embodiments described herein. The inter-component messaging or any aspect thereof may be implemented in any environment.

FIG. 5C illustrates a computing system that comprises (1) applications that use OAuth in conjunction with an identity access management service 560—without use of a proxy service—as well as (2) applications that use a proxy for movable applications 562.

In operation, the proxy application is registered with the IAM (exchange 1), upon which registration, the registration authentication (e.g., client secret) is delivered to the requesting proxy application (exchange 2). The same application "Application1" that is shown as being hosted at $URL_1$ can be moved to another node, possibly to another node that is behind the firewall/router at 192.168.10.1. That application can be registered with the IAM by designating URL as the callback URL. When that application at private IP address 192.168.10.1 issues an authentication request (interaction 3), the authentication is delivered to the proxy at URL (interaction 4), and the proxy in turn delivers access token1 (interaction 5) to the instance of "Application1" at private IP address 192.168.10.1.

The foregoing series of interactions can be carried out any number of times for any number of applications and any number of application invocations. More specifically, the same application "Application2" that is shown as being hosted at URL2 can be moved to another node, possibly to another node that is behind the firewall/router at 192.168.10.2. Assuming that that application had been registered with the IAM by designating $URL_P$ as the callback URL, then when that application at private IP address 192.168.10.2 issues an authentication request (interaction 6) the authentication is delivered to the proxy at $URL_P$, (interaction 7) and the proxy in turn delivers access token2 (interaction 8) to the instance of "Application2" at private IP address 192.168.10.2.

ADDITIONAL EMBODIMENTS OF THE DISCLOSURE

Additional Practical Application Examples

Figure 6:
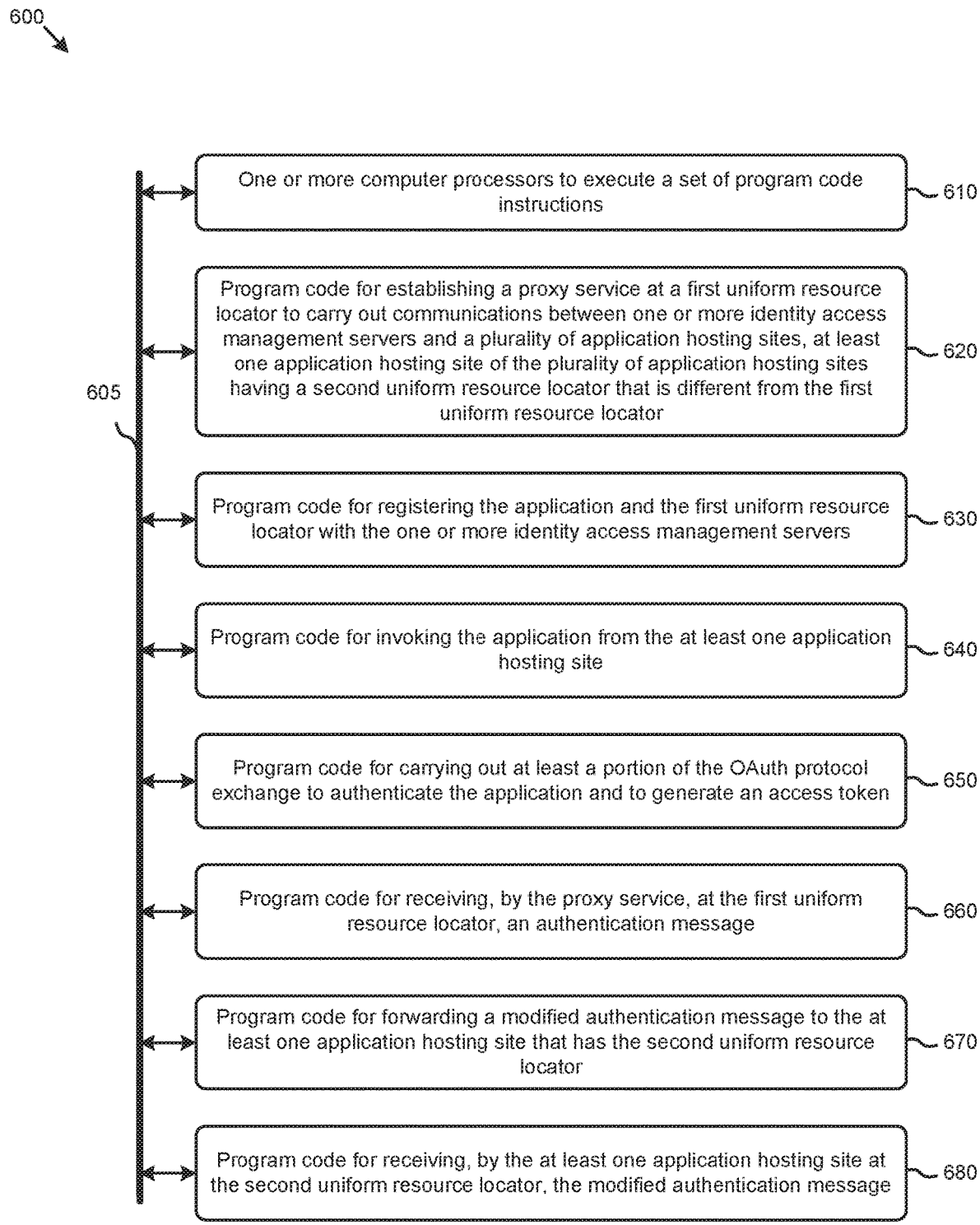
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. This and other embodiments present particular arrangements of elements that, individually and/or as combined, serve to form improved technological processes that address avoiding re-registering of an application with a trusted identity service each time the application hosting site changes. The partitioning of system 600 is merely illustrative and other partitions are possible. As an option, the system 600 may be implemented in the context of the architecture and functionality of the embodiments described herein. Of course, however, the system 600 or any operation therein may be carried out in any desired environment.

The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims.

The shown embodiment implements a portion of a computer system, presented as system 600, comprising one or more computer processors to execute a set of program code instructions (module 610) and modules for accessing memory to hold program code instructions to perform: establishing a proxy service at a first uniform resource locator to carry out communications between one or more identity access management servers and a plurality of application hosting sites, at least one application hosting site of the plurality of application hosting sites having a second uniform resource locator that is different from the first uniform resource locator (module 620); registering the application and the first uniform resource locator with the one or more identity access management servers (module 630); invoking the application from the at least one application hosting site (module 640); carrying out at least a portion of the OAuth protocol exchange to authenticate the application and to generate an access token (module 650); receiving, by the proxy service, at the first uniform resource locator, an authentication message (module 660); forwarding a modified authentication message that addresses the at least one application hosting site that has the second uniform resource locator (module 670); and receiving, by the at least one application hosting site at the second uniform resource locator, the modified authentication message (module 680).

Variations of the foregoing may include more or fewer of the shown modules. Certain variations may perform more or fewer (or different) steps and/or certain variations may use data elements in more or in fewer (or different) operations.

System Architecture Overview
Additional System Architecture Examples

Figure 7A:
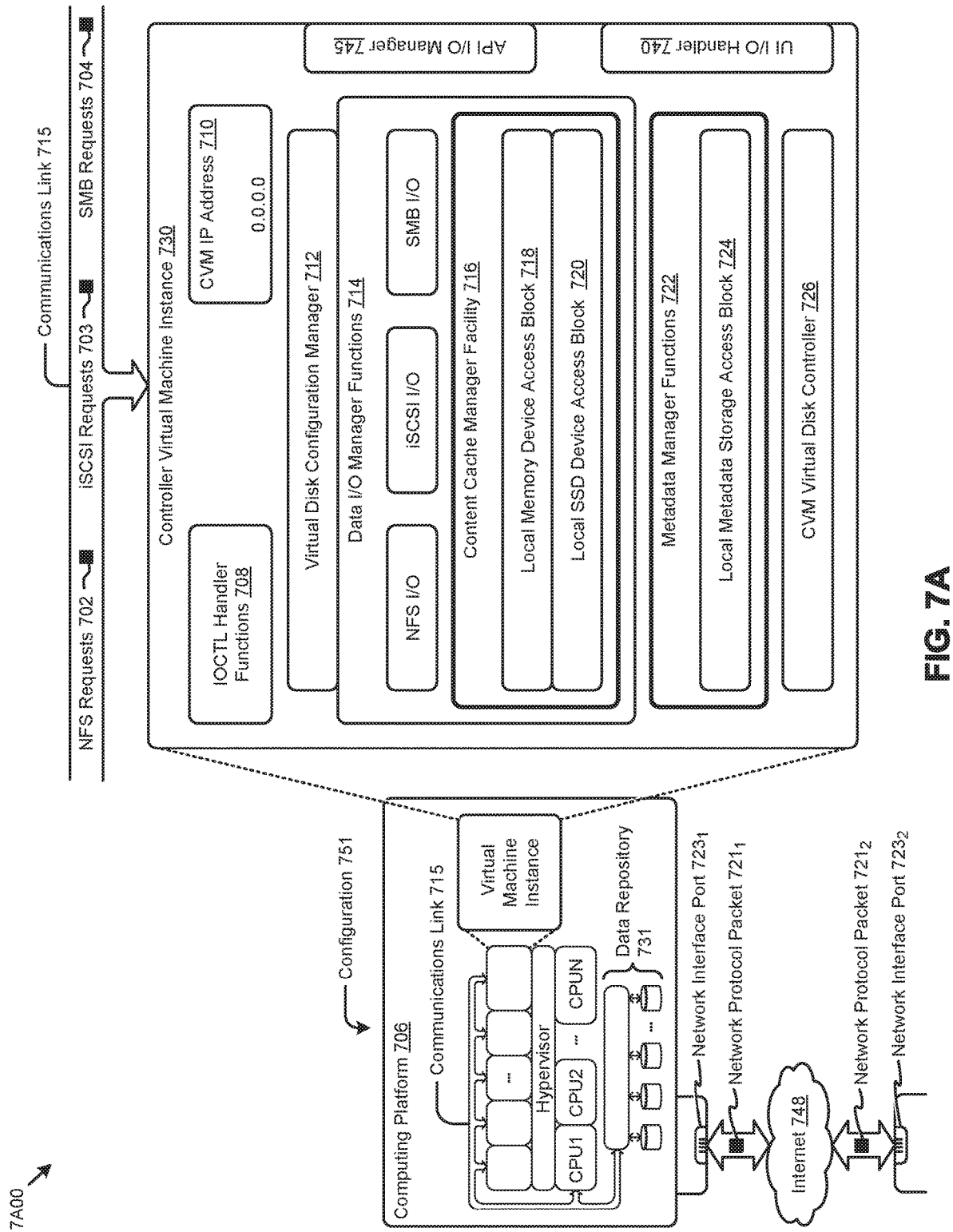
FIG. 7A, FIG. 7B, and FIG. 7C depict virtualized controller architectures comprising collections of interconnected components suitable for implementing embodiments of the present disclosure and/or for use in the herein-described environments.

FIG. 7A depicts a virtualized controller as implemented by the shown virtual machine architecture 7A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or JO) as received from any or every source within the computing platform. An example implementation of such a virtual machine that processes storage I/O is depicted as 730.

In this and other configurations, a controller virtual machine instance receives block I/O (input/output or JO) storage requests as network file system (NFS) requests in the form of NFS requests 702, and/or internet small computer storage interface (iSCSI) block JO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output (I/O or JO) can be handled by one or more JO control handler functions (e.g., IOCTL handler functions 708) that interface to other functions such as data JO manager functions 714 and/or metadata manager functions 722. As shown, the data JO manager functions can include communication with virtual disk configuration manager 712 and/or can include direct or indirect communication with any of various block JO functions (e.g., NFS JO, iSCSI JO, SMB JO, etc.).

In addition to block JO functions, configuration 751 supports JO of any form (e.g., block JO, streaming JO, packet-based JO, HTTP traffic, etc.) through either or both of a user interface (UI) handler such as UI IO handler 740 and/or through any of a range of application programming interfaces (APIs), possibly through API TO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). External data repository 731 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 724. External data repository 731 can be configured using CVM virtual disk controller 726, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). Configuration 751 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

Computing platform 706 may transmit and receive messages that can be composed of configuration data and/or any other forms of data and/or instructions organized into a data structure (e.g., communications packets). In some cases, the data structure includes program code instructions (e.g., application code) communicated through the Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or the results of executing program code can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to using OAuth protocols in the presence of dynamically-changing application hosting sites. In some embodiments, a module may include one or more state machines and/or combinational logic used to implement or facilitate the operational and/or performance characteristics.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of using OAuth protocols in the presence of dynamically-changing application hosting sites). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to using OAuth protocols in the presence of dynamically-changing application hosting sites, and/or for improving the way data is manipulated when performing computerized operations pertaining to providing a proxy service to manage application hosting site changes without requiring re-registering of the application with a trusted site.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 7B:
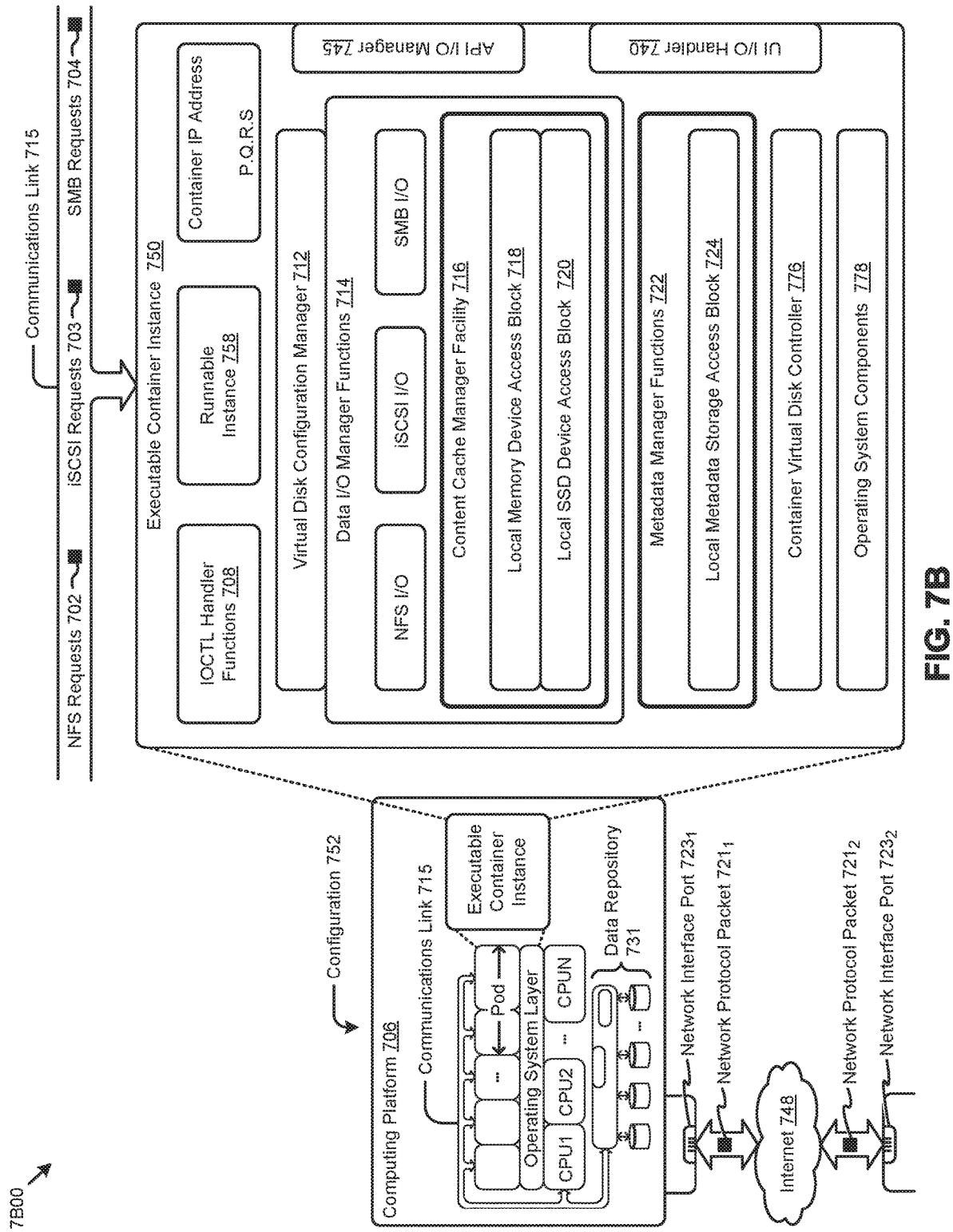

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls–a", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
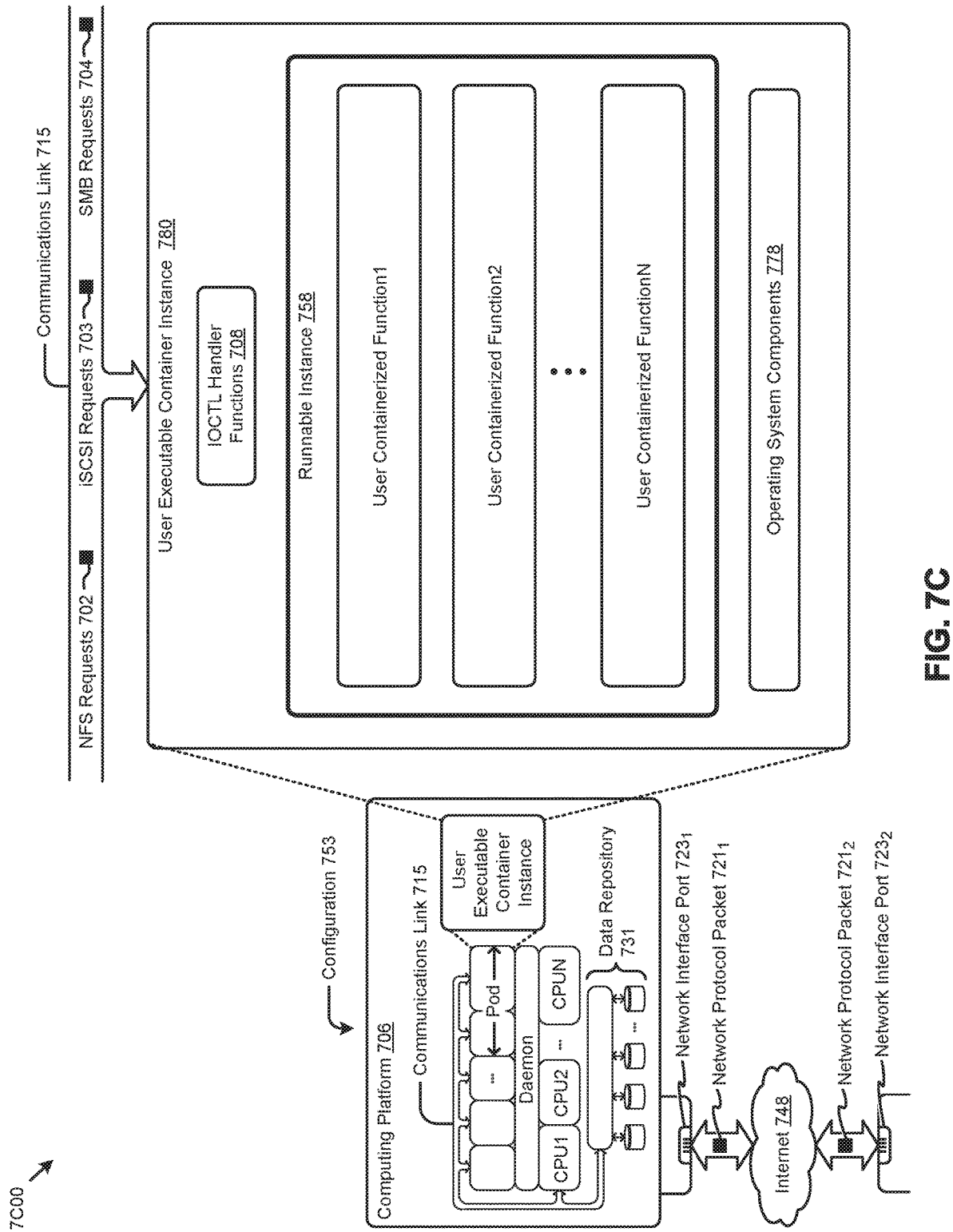

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 780. Configuration 753 includes a daemon layer (as shown) that performs certain functions of an operating system.

User executable container instance 780 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 780.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
operating a proxy service having a proxy uniform resource locator (URL) that communicates with an identity access management server, wherein an application is registered with the identity access management server using the proxy URL, and the application resides at a first network location corresponding to a first URL; and
authenticating the application after the application is moved from the first network location to a second network location, by:
receiving, at the proxy service having the proxy URL, an authentication message generated for the application; and
forwarding, by the proxy service having the proxy URL, the authentication message to the application at the second network location having a second URL.

2. The method of claim 1, further comprising:
receiving, from a user of the application, an application command, and performing at least a portion of the application command using the authentication message.

3. The method of claim 1, wherein a portion of an OAuth protocol exchange is carried out to authenticate the application and to generate an access token, where the access token is associated with an application command.

4. The method of claim 1, wherein the proxy URL of the proxy service resolves to a publicly-accessible IP address.

5. The method of claim 1, wherein the proxy service performs decryption of at least a portion of the authentication message.

6. The method of claim 1, wherein the authentication message is a redirected message that is received at the second URL.

7. The method of claim 1, wherein the authentication message is generated in response to an authentication request received at the identity access management server, the authentication request being either received directly from the application or routed through the proxy service.

8. A non-transitory computer readable medium having stored thereon a sequence of instructions which, when stored in memory and executed by a processor causes the processor to perform a set of acts comprising:
operating a proxy service having a proxy uniform resource locator (URL) that communicates with an identity access management server, wherein an application is registered with the identity access management server using the proxy URL, and the application resides at a first network location corresponding to a first URL; and
authenticating the application after the application is moved from the first network location to a second network location, by:
receiving, at the proxy service having the proxy URL, an authentication message generated for the application; and
forwarding, by the proxy service having the proxy URL, the authentication message to the application at the second network location having a second URL.

9. The computer readable medium of claim 8, the set of acts further comprising receiving, from a user of the application, an application command, and performing at least a portion of the application command using the authentication message.

10. The computer readable medium of claim 8, wherein a portion of an OAuth protocol exchange is carried out to authenticate the application and to generate an access token, where the access token is associated with an application command.

11. The computer readable medium of claim 8, wherein the proxy URL of the proxy service resolves to a publicly-accessible IP address.

12. The computer readable medium of claim 8, wherein the proxy service performs decryption of at least a portion of the authentication message.

13. The computer readable medium of claim 8, wherein the authentication message is a redirected message that is received at the second URL.

14. The computer readable medium of claim 8, wherein the proxy service performs a function of the identity access management server.

15. A system comprising:
a non-transitory storage medium having stored thereon a sequence of instructions; and
a physical processor that executes the sequence of instructions to cause a set of acts, the acts comprising,
operating a proxy service having a proxy uniform resource locator (URL) that communicates with an identity access management server, wherein an application is registered with the identity access management server using the proxy URL, and the application resides at a first network location corresponding to a first URL; and
authenticating the application after the application is moved from the first network location to a second network location, by:
receiving, at the proxy service having the proxy URL, an authentication message generated for the application; and
forwarding, by the proxy service having the proxy URL, the authentication message to the application at the second network location having a second URL.

16. The system of claim 15, wherein a portion of an OAuth protocol exchange is carried out to authenticate the application and to generate an access token, where the access token is associated with an application command.

17. The system of claim 15, wherein the proxy URL of the proxy service resolves to a publicly-accessible IP address.

18. The system of claim 15, wherein the authentication message is a redirected message that is received at the second URL.

19. The system of claim 15, wherein the authentication message is generated in response to an authentication request received at the identity access management server, the authentication request being either received directly from the application or routed through the proxy service.

20. The system of claim 15, wherein the proxy service performs decryption of at least a portion of the authentication message.

21. The system of claim 15, the set of acts further comprising receiving, from a user of the application, an application command, and performing at least a portion of the application command using the authentication message.

* * * * *